(12) United States Patent
Arihara et al.

(10) Patent No.: US 8,775,057 B2
(45) Date of Patent: Jul. 8, 2014

(54) CONTROL DEVICE FOR IN-CYLINDER FUEL INJECTION TYPE INTERNAL COMBUSTION ENGINE

(75) Inventors: Yoshinobu Arihara, Hitachinaka (JP); Tetsuo Matsumura, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 254 days.

(21) Appl. No.: 13/156,385

(22) Filed: Jun. 9, 2011

(65) Prior Publication Data
US 2011/0307164 A1 Dec. 15, 2011

(30) Foreign Application Priority Data
Jun. 11, 2010 (JP) ................... 2010-133501

(51) Int. Cl.
F02D 41/30 (2006.01)
(52) U.S. Cl.
USPC .......................................... 701/105; 123/299
(58) Field of Classification Search
USPC .......... 701/103–105, 108; 123/295, 297, 299, 123/300, 568.11, 568.12, 568.21
See application file for complete search history.

(56) References Cited

U.S. PATENT DOCUMENTS

| | | | |
|---|---|---|---|
| 5,904,129 A | 5/1999 | Kadota | |
| 6,055,956 A * | 5/2000 | Nishimura et al. | 123/299 |
| 6,116,208 A * | 9/2000 | Nishimura et al. | 123/295 |
| 6,234,139 B1 * | 5/2001 | Taga et al. | 123/295 |
| 6,273,056 B1 * | 8/2001 | Shirakawa et al. | 123/305 |
| 6,325,041 B1 * | 12/2001 | Mamiya et al. | 123/299 |
| 6,397,817 B1 | 6/2002 | Yoshida et al. | |
| 6,401,703 B1 * | 6/2002 | Mamiya et al. | 123/674 |
| 8,020,538 B2 * | 9/2011 | Surnilla et al. | 123/568.12 |
| 8,340,887 B2 * | 12/2012 | Yamaguchi et al. | 701/104 |
| 2003/0196635 A1 * | 10/2003 | Kataoka et al. | 123/299 |
| 2003/0230276 A1 | 12/2003 | Kataoka et al. | |
| 2004/0181331 A1 * | 9/2004 | Nagaishi et al. | 701/104 |
| 2006/0102140 A1 * | 5/2006 | Sukegawa et al. | 123/297 |
| 2006/0102141 A1 * | 5/2006 | Nakayama et al. | 123/298 |
| 2008/0147300 A1 * | 6/2008 | Kakuya et al. | 701/103 |
| 2009/0271091 A1 * | 10/2009 | Morita | 701/103 |
| 2010/0292909 A1 * | 11/2010 | Gwidt et al. | 701/103 |

FOREIGN PATENT DOCUMENTS

| | | |
|---|---|---|
| EP | 1 568 876 A2 | 8/2005 |
| EP | 2 123 887 A1 | 11/2009 |
| FR | 2 843 422 A1 | 2/2004 |
| JP | 2002-161790 A | 6/2002 |
| JP | 2009-102997 A | 5/2009 |
| JP | 2009-102998 A | 5/2009 |

OTHER PUBLICATIONS

European Search Report dated Oct. 4, 2011 (five (5) pages).

* cited by examiner

Primary Examiner — John Kwon
Assistant Examiner — Johnny H Hoang
(74) Attorney, Agent, or Firm — Crowell & Moring LLP (57) ABSTRACT

Provided is a control device for an in-cylinder injection engine which reduces an amount of fuel attaching and remaining on a piston crown surface so as to bring the first injection as advanced as possible and suppress an increase in the number of exhaust particles of PM, when fuel injection is performed a plurality of times in one cycle in the in-cylinder injection engine. At least the first fuel injection of the respective injections dividedly performed the plurality of times is performed in an intake stroke. At least the first injection start timing of the respective injections dividedly performed the plurality of times is set in accordance with an EGR amount. The first injection start timing is more advanced when the EGR amount is large than when the EGR amount is small.

8 Claims, 10 Drawing Sheets

CONTROL DEVICE FOR IN-CYLINDER FUEL INJECTION TYPE INTERNAL COMBUSTION ENGINE

BACKGROUND OF THE INVENTION

1. Field of the Invention

The present invention relates to a control device for an in-cylinder fuel injection type internal combustion engine.

2. Background Art

An in-cylinder injection type internal combustion engine which injects fuel directly into a cylinder is widely known. The in-cylinder injection type internal combustion engine performs direct fuel injection into a combustion chamber by means of a fuel injection valve, and is intended to achieve a reduction in exhaust gas substance and fuel consumption, enhancement in output, and the like.

In the in-cylinder injection type internal combustion engine, the injected fuel may attach to a piston crown surface or a cylinder bore wall surface depending on a fuel injection start timing.

If an amount of fuel attaching and remaining on the cylinder bore wall surface is large, such fuel cannot be vaporized completely until ignition in some cases, so that unburned gas is apt to increase. Therefore, for example, JP Patent Publication (Kokai) No. 2009-102997 and JP Patent Publication (Kokai) No. 2009-102998 each disclose a technology of changing, when a temperature on the cylinder bore wall surface is low, the fuel injection start timing from an injector in an intake stroke so that the fuel spreads over the piston crown surface to be easily vaporized.

In addition, JP Patent Publication (Kokai) No. 2002-161790 discloses a technology in which: fuel injection is performed a plurality of times in one cycle, and the fuel injection amount for each time is accordingly made smaller, to thereby reduce the fuel attachment to the cylinder bore wall surface; and an interval between one injection and the next injection is kept constant at a rough crank angle with respect to a change in operation conditions of an engine, that is, the injection interval is set to be longer as the rotation becomes lower and is set to be shorter as the rotation becomes higher, to thereby decentrally spray the fuel.

On the other hand, if an amount of fuel attaching and remaining on the piston crown surface and the cylinder bore wall surface is large, the number of exhaust particles of particulate matters (hereinafter, referred to as PM) is apt to increase. In particular, if the amount of fuel attaching on the piston crown surface is large, the number of exhaust particles of PM is apt to increase. In recent years, there is an increasing need for the in-cylinder injection type internal combustion engine to reduce the number of exhaust particles of PM.

SUMMARY OF THE INVENTION

In the in-cylinder injection type internal combustion engine, when the injection start timing is advanced in order to reduce the amount of fuel attaching and remaining on the cylinder bore wall surface, the amount of fuel attaching and remaining on the piston crown surface increases, and the number of exhaust particles of PM is apt to increase. On the other hand, when the injection start timing is retarded in order to suppress the increase in the number of exhaust particles of PM, the amount of fuel attaching and remaining on the cylinder bore wall surface increases, and unburned gas is apt to increase.

Such a problem similarly arises in the case of divided injection in which the fuel injection is performed a plurality of times in one cycle. In addition, the interval between one injection and the next injection is required in the divided injection, and hence an end timing of the injection is closer to the retard side than the case of injecting the fuel only once in one cycle. If an end timing of the last divided injection is closer to the retard side than a predetermined crank angle, the fuel cannot be vaporized completely until ignition in some cases, so that the homogeneity of a mixture gas inside of the cylinder is apt to decrease.

The present invention has an object to provide a control device for an in-cylinder injection type internal combustion engine which reduces an amount of fuel attaching and remaining on a piston crown surface so as to bring the first injection as advanced as possible and suppress an increase in the number of exhaust particles of PM, when fuel injection is performed a plurality of times in one cycle in the in-cylinder injection type internal combustion engine.

In order to achieve the above-mentioned object, the present invention provides a control device for an in-cylinder fuel injection type internal combustion engine, in which a fuel injection valve which injects fuel directly into a combustion chamber is provided, the control device including: divided multi-stage injection means for performing fuel injection a plurality of times in one cycle; an EGR device which allows exhaust gas emitted from the combustion chamber to flow back into the combustion chamber; and means for detecting or calculating an EGR amount allowed to flow back into the combustion chamber, in which: at least a first fuel injection of the respective injections dividedly performed the plurality of times is performed in an intake stroke; at least a first injection start timing of the respective injections dividedly performed the plurality of times is set in accordance with an EGR amount; and the first injection start timing is more advanced when the EGR amount is large than when the EGR amount is small.

According to the present invention, in divided multi-stage injection in which the fuel to be injected in one cycle is dividedly injected a plurality of times, the first injection start timing of the respective injections dividedly performed the plurality of times is set in accordance with the EGR amount. Accordingly, the divided multi-stage injection can be performed at such an injection timing that an amount of fuel attaching and remaining on a piston crown surface can be reduced, and an increase in the number of exhaust particles of PM can be suppressed.

DETAILED DESCRIPTION OF THE PREFERRED EMBODIMENT

Hereinafter, an embodiment of the present invention is described in detail with reference to the drawings.

Figure 1:
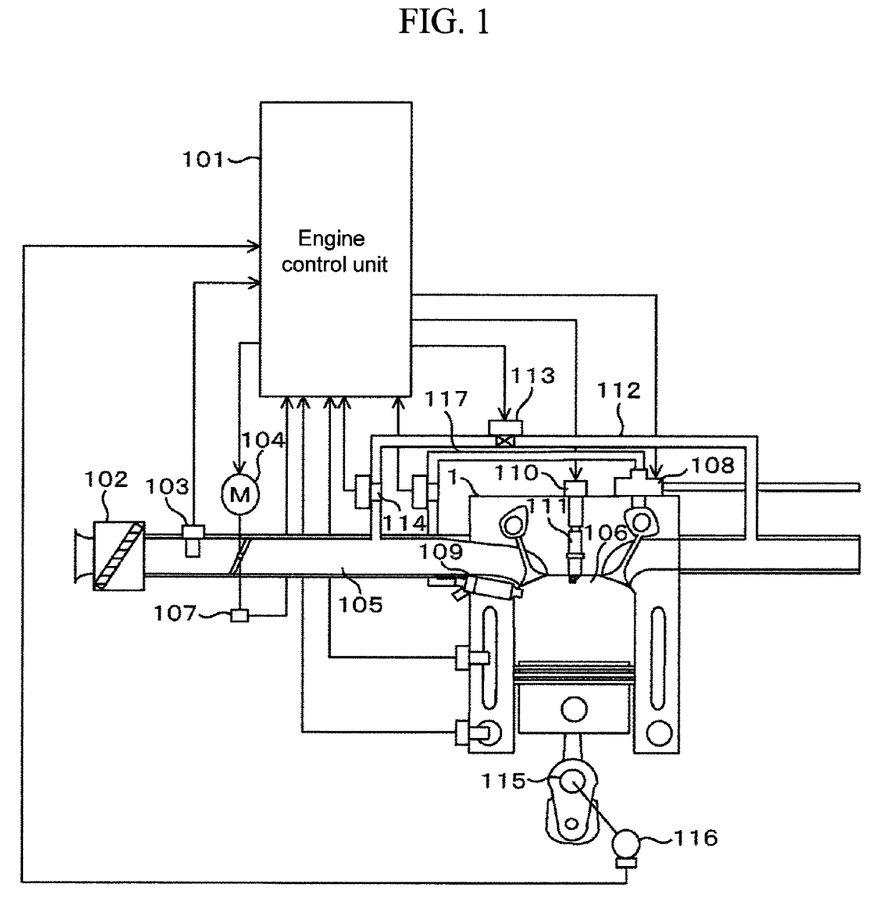
FIG. 1 is a configuration schematic view of an overall control system of an in-cylinder injection engine according to an embodiment of the present invention.

FIG. 1 is a configuration schematic view of an overall control system of an in-cylinder injection type internal combustion engine 1 constituting the embodiment of the present invention. Intake air taken in from an entrance part of an air cleaner 102 passes through an intake air flowmeter (airflow sensor) 103, passes through an electronically-controlled throttle valve 104 which controls an intake air flow rate, is distributed to each intake pipe 105 connected to each cylinder, and then is introduced into a combustion chamber 106 of each cylinder. In addition, a signal representing the intake air flow rate is outputted from the intake air flowmeter 103 to an engine control unit 101. A throttle opening degree sensor 107 which detects the opening degree of the electronically-controlled throttle valve 104 is attached, and a signal thereof is also outputted to the engine control unit 101.

Fuel is primarily pressurized by a low-pressure fuel pump (not shown), then is secondarily pressurized into a higher pressure by a high-pressure fuel pump 108, passes through a common rail 117, and is injected into the combustion chamber 106 from a fuel injection valve 109 provided to each cylinder. The fuel injected into the combustion chamber is used to generate a mixture gas with the intake air, is ignited at a spark plug 111 by ignition energy from an ignition coil 110, and burns inside of the combustion chamber 106.

Exhaust gas emitted from the combustion chamber 106 is emitted to an exhaust pipe, and an EGR inlet is formed in the middle of the exhaust pipe. Part of the exhaust gas flowing through the exhaust pipe (EGR gas) enters an EGR pipe 112 from the EGR inlet, flows to an EGR control valve 113, and flows back into the intake pipe 105 from an EGR outlet.

A flow rate of the EGR gas is adjusted by the EGR control valve 113. An EGR flow rate sensor 114 for sensing the flow rate of the EGR gas is attached to the inside of the EGR pipe. A flow rate detection signal of the EGR flow rate sensor is outputted to the engine control unit 101.

A crank angle sensor 116 attached to a crankshaft 115 of the engine outputs a signal representing a rotation position of the crankshaft to the engine control unit 101.

Figure 2:
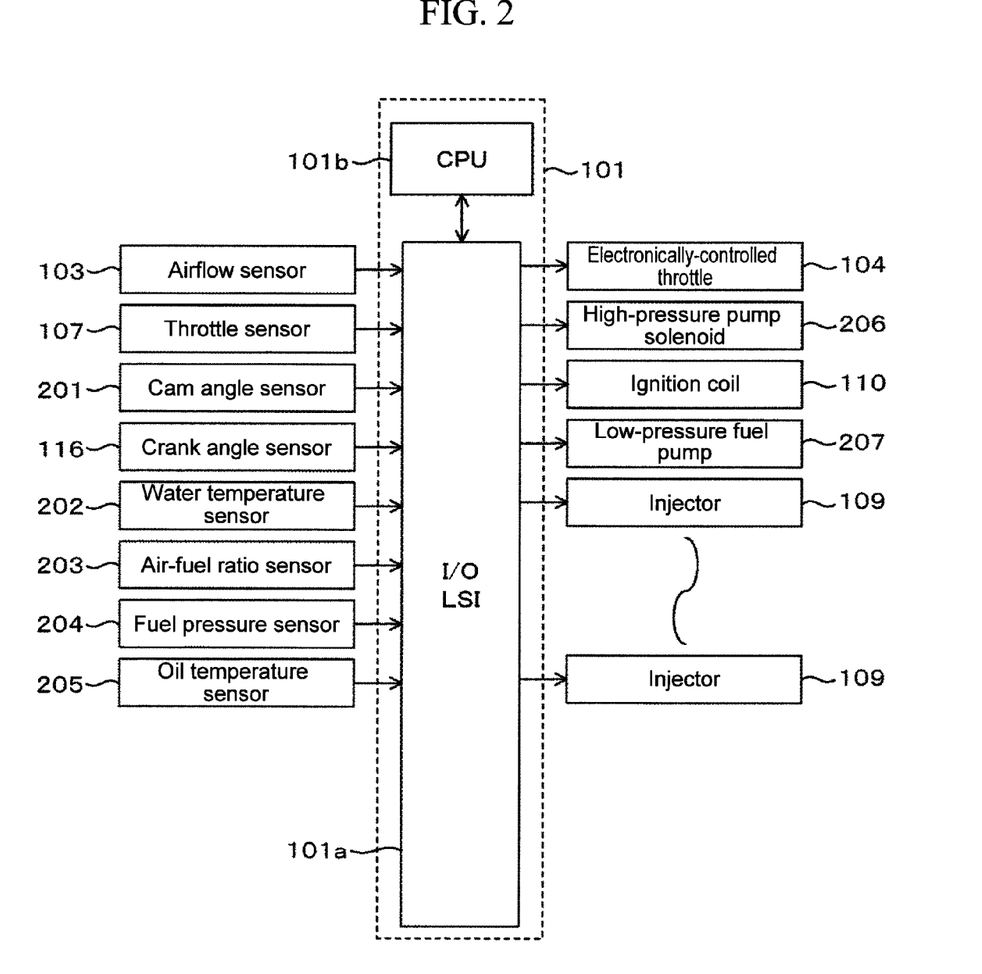
FIG. 2 is a block diagram illustrating an input/output signal relation of an engine control unit, which is used in the system configuration describing an embodiment of a control device for the in-cylinder injection engine according to the embodiment of the present invention.

FIG. 2 illustrates an input/output relation of the engine control unit 101. The engine control unit 101 includes an I/O LSI 101a including an A/D converter, a CPU 101b, and the like. The engine control unit 101 is configured to: take in, as inputs, signals from various sensors including the airflow sensor 103, the throttle opening degree sensor 107, the crank angle sensor 116, a water temperature sensor 202, an air-fuel ratio sensor 203, a fuel pressure sensor 204, an oil temperature sensor 205, and the EGR flow rate sensor 114; execute predetermined arithmetic processing; output various control signals calculated as arithmetic processing results; and supply predetermined control signals to the electronically-controlled throttle valve 104, a high-pressure pump solenoid 206, the ignition coil 110, and each fuel injection valve 109 which are actuators, to thereby perform control of fuel pressure inside of the common rail, fuel injection amount control, ignition timing control, and the like. The I/O LSI is provided with a drive circuit which drives each injector, causes a step-up circuit (not shown) to raise and supply a voltage supplied from a battery, and causes an IC (not shown) to control a current, to thereby drive each injector.

Figure 3:
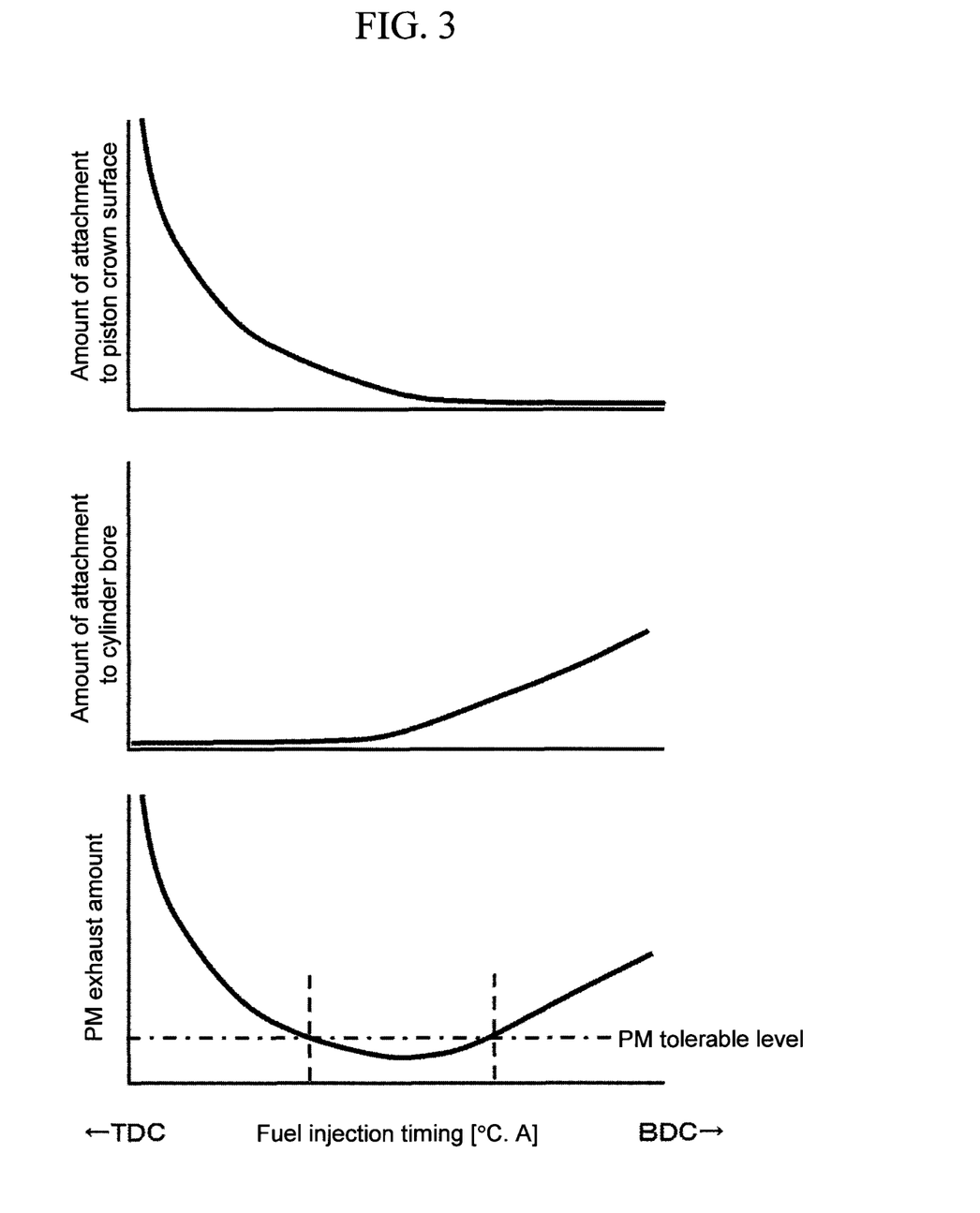
FIG. 3 is a graph showing relations of a fuel attachment amount and a PM exhaust amount with a fuel injection timing.

With reference to FIG. 3, a relation between a fuel injection timing (a fuel injection start timing) and a PM exhaust amount is described.

FIG. 3 shows relations of an amount of fuel attachment to a piston crown surface, an amount of fuel attachment to a cylinder bore, and the PM exhaust amount with the injection timing when the fuel is injected once. In the case where the fuel injection timing is excessively early (near TDC), the amount of fuel attachment to the piston crown surface increases, and the PM generation amount is apt to increase. On the other hand, in the case where the fuel injection timing is excessively late (near BDC), the amount of fuel attachment to the cylinder bore increases, and similarly, the PM generation amount is apt to increase. In addition, an influence of the PM generation amount on the fuel attachment to the cylinder bore is relatively smaller than that on the fuel attachment to the piston crown surface.

In order to minimize the PM generation amount when the fuel is injected once, it is desirable to inject the fuel during the intake stroke middle period during which the sum of the amount of fuel attachment to the piston crown surface and the amount of fuel attachment to the cylinder bore becomes smallest.

Figure 4:
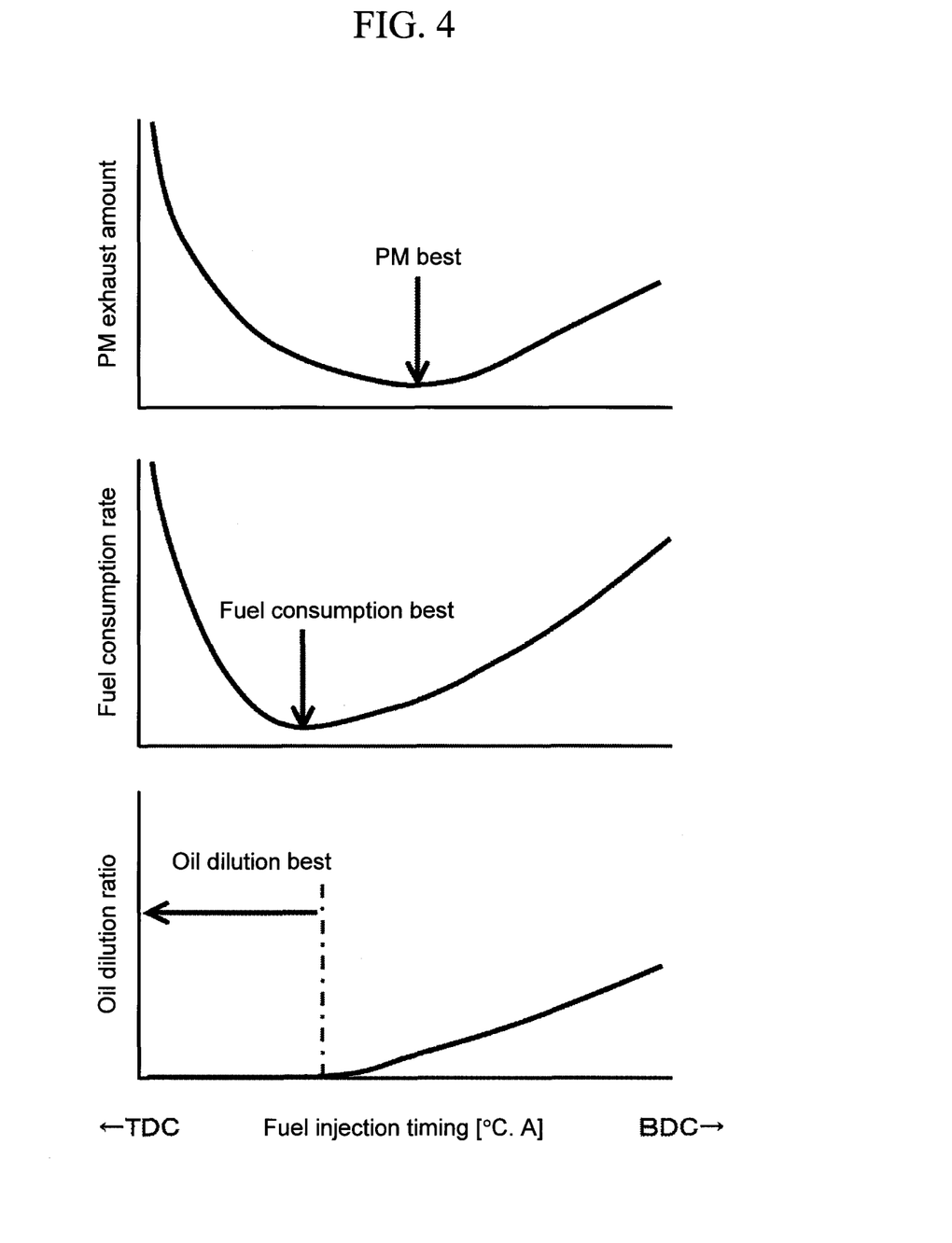
FIG. 4 is a graph showing relations of the PM exhaust amount, a fuel consumption rate, and an oil dilution ratio with the fuel injection timing.

With reference to FIG. 4, relations of the PM exhaust amount, a fuel consumption rate, and an oil dilution ratio are described.

FIG. 4 shows the PM exhaust amount, the fuel consumption rate, and the oil dilution ratio when the fuel injection timing is changed. The fuel injection timing at which the PM exhaust amount becomes smallest falls within the intake stroke middle period, whereas the fuel injection timings at which the fuel consumption rate and the oil dilution ratio become smallest fall within the intake stroke initial period. In order to make all the parameters the best, it is desirable to reduce PM at an early fuel injection timing.

Figure 5:
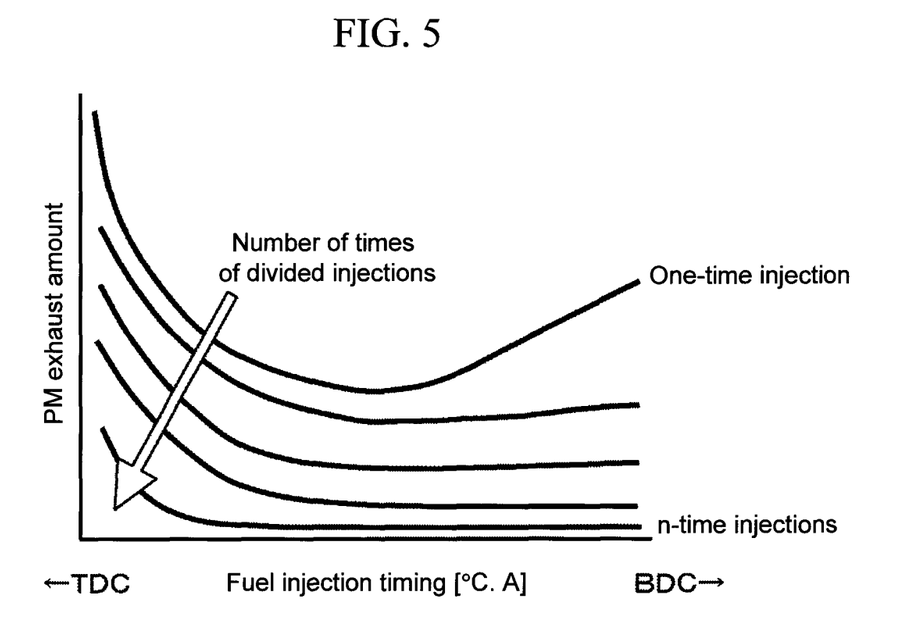
FIG. 5 is a graph showing a relation between the number of times of divided injections and the PM exhaust amount.

With reference to FIG. 5, a relation between the number of times of divided injections and the PM exhaust amount is described.

FIG. 5 shows the PM exhaust amount with respect to the number of times of division when a fuel amount necessary for one cycle is divided and the fuel is injected a plurality of times. Each time the number of times of division is increased, the fuel injection amount for each time decreases. As a result, the fuel attachment to the piston crown surface decreases, and the PM exhaust amount decreases.

Figure 6:
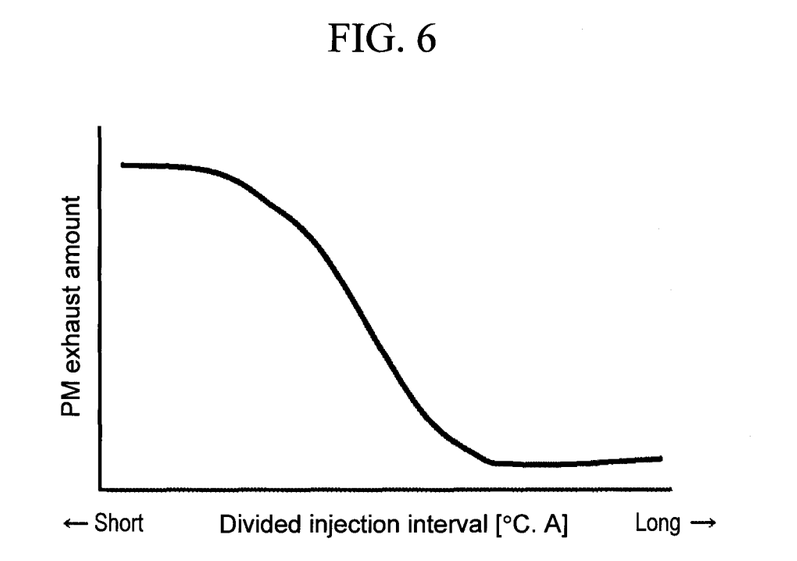
FIG. 6 is a graph showing a relation between a divided injection interval and the PM exhaust amount.

With reference to FIG. 6, a relation between a divided injection interval and the PM exhaust amount is described.

If the divided injection interval is excessively short, an effect of the divided injection cannot be obtained sufficiently, and hence a reduction in PM exhaust amount cannot be achieved. This means that it is necessary to set an interval between one injection and the next injection to a predetermined interval or longer in order to reduce the PM exhaust amount.

Figure 7:
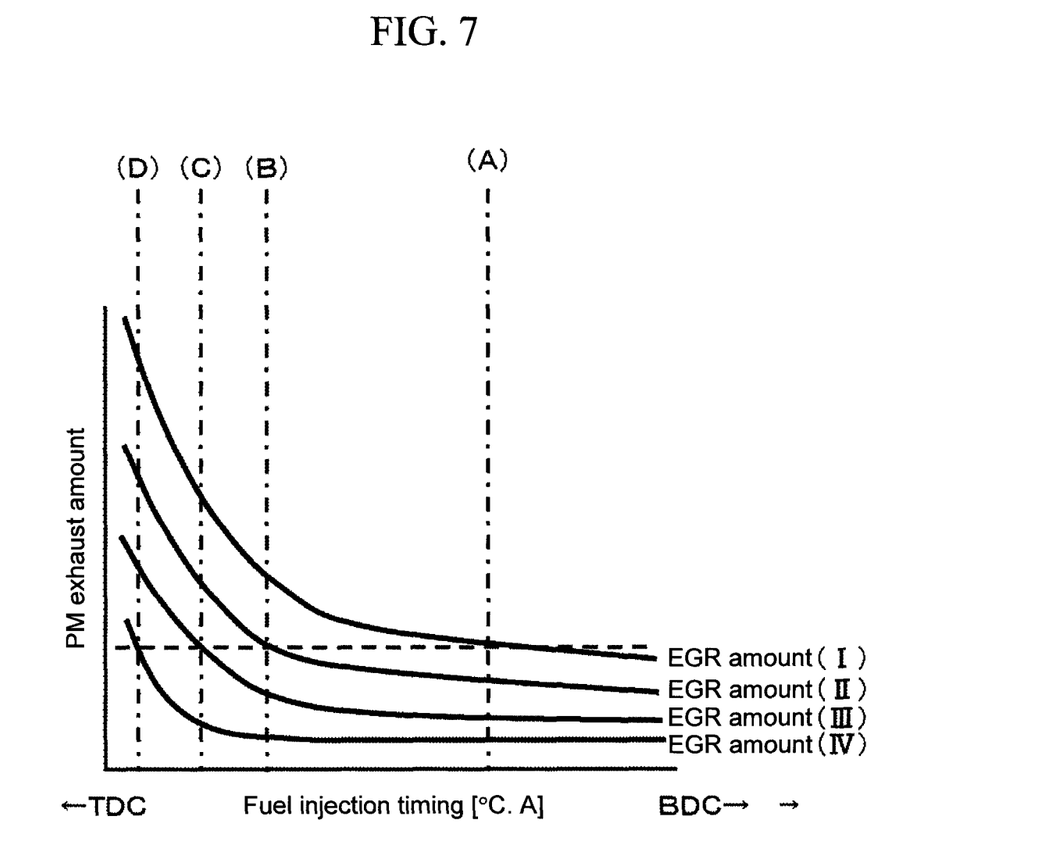
FIG. 7 is a graph showing a relation between an EGR amount and the PM exhaust amount.

With reference to FIG. 7, a relation between an EGR amount and the PM exhaust amount is described.

FIG. 7 shows the PM exhaust amount when the EGR amount increases in order of (I) →(II)→(III)→(IV) during divided injection with a given number of times of division. As the EGR amount increases, the PM exhaust amount decreases. This is because a temperature of air taken into the combustion chamber is raised by the EGR gas, vaporization of the fuel injected into the cylinder is promoted, and the amount of fuel attachment to the piston crown surface is accordingly decreased.

In the case of comparison using a given PM generation amount level, with reference to a fuel injection timing (A) at which the given PM exhaust amount can be achieved at the time of the EGR amount (I), as the EGR amount increases in order of (II)→(III)→(IV), the fuel injection timing (fuel injection start timing) at which the given PM generation amount can be achieved can be made earlier in order of (B)→(C)→(D).

Next, with reference to FIG. 8 to FIG. 11, specific control contents of divided multi-stage injection control of the internal combustion engine according to the present embodiment are described.

Figure 8:
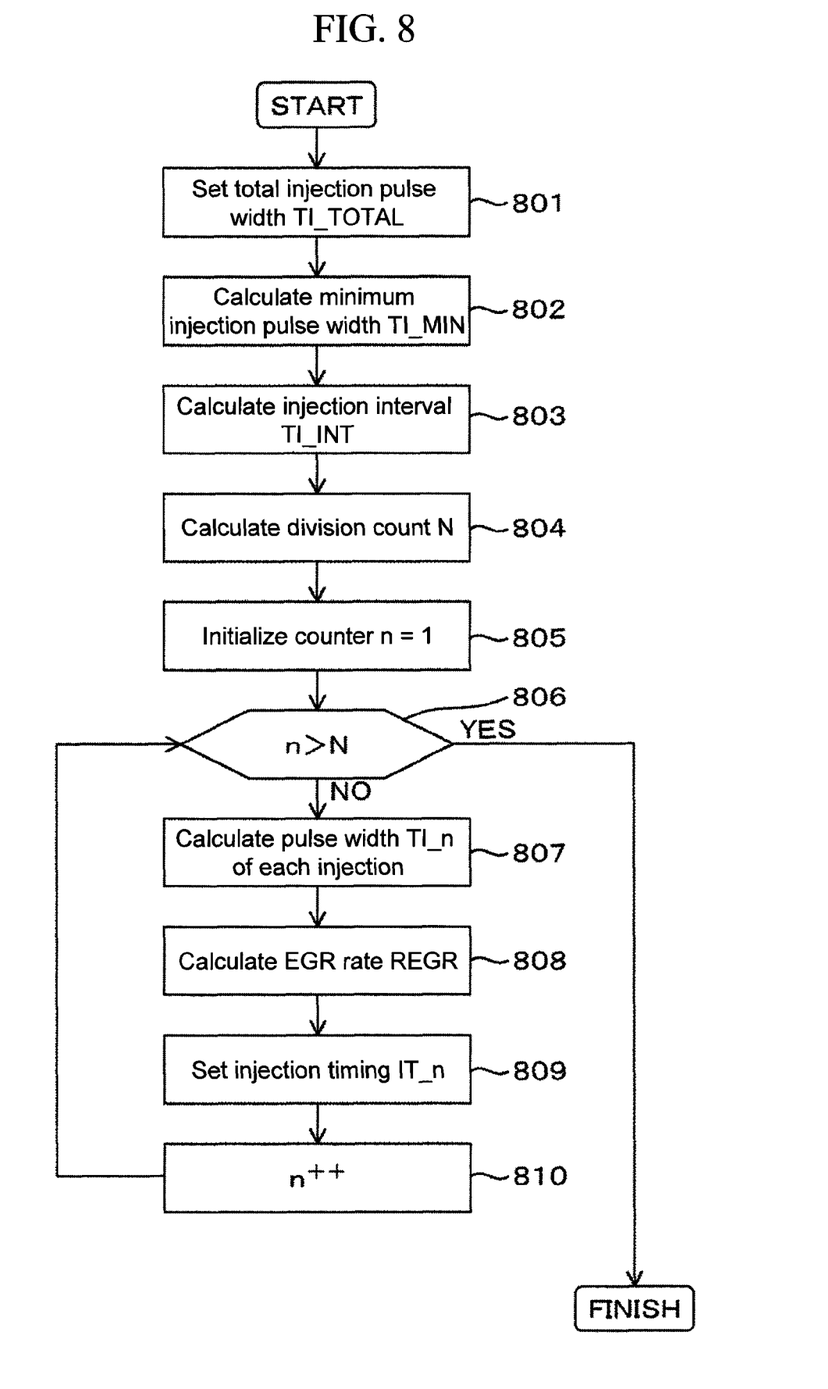
FIG. 8 is a flow chart showing control contents of divided multi-stage injection control of the in-cylinder injection engine according to the embodiment of the present invention.

FIG. 8 is a flow chart showing the control contents of the divided multi-stage injection control according to the embodiment of the present invention.

The contents of FIG. 8 are programmed in the CPU of the engine control unit 101, and are repeatedly executed in a predetermined cycle. On the basis of an injection pulse width and an injection timing which are calculated according to the processing contents of FIG. 8, the engine control unit 101 supplies a predetermined control signal to each fuel injection valve 109, and executes a plurality of fuel injections in one cycle.

In Step 801, a total injection pulse width TI_TOTAL, which is a total fuel amount injected in one cycle from each fuel injection valve 109, is set. The total injection pulse width TI_TOTAL is set in accordance with an intake air amount sensed by the airflow sensor 103, an air-fuel ratio set according to an operation state and the like, a fuel pressure calculated using a signal of the fuel pressure sensor 204, and the like.

In Step 802, a minimum injection pulse width TI_MIN is calculated. Here, the minimum injection pulse width is set in accordance with various characteristics such as a fuel pressure characteristic, an electrical characteristic, and a mechanical characteristic of the fuel injection valve 109 and a drive current waveform of the injector.

In Step 803, the injection interval, which is an injection interval between divided injections, is calculated. The injection interval is set to a predetermined interval or longer in terms of fuel attachment and homogeneity of the mixture gas and in terms of securement of an injector drive current. If the injection interval is excessively short, a fuel spray state becomes substantially the same as that of one-time injection. As a result, an effect of the divided injection cannot be obtained, and the fuel attachment to the piston crown surface and the cylinder bore cannot be decreased. In addition, each time the injector drive circuit drives the injector, a voltage in the step-up circuit drops. Therefore, a period of time until a return to its original voltage is required, and it is necessary to stand by without performing the next fuel injection during this step-up return period.

In Step 804, a division count N is set. A division expression of TI_TOTAL÷TI_MIN is calculated by using the total injection pulse width TI_TOTAL set in Step 801 and the minimum injection pulse width TI_MIN set in Step 802, and the resultant quotient is set as the division count N.

In Step 805, a counter n is initialized.

In Step 806, it is determined whether or not the counter n is larger than the division count N. If yes (settings of n=1 to N are completed), the processing is finished. If the counter n is equal to or smaller than the division count N, processing in Step 807 and the subsequent steps is performed.

In Step 807, an injection pulse width TI_n (n=1 to N) of each injection is calculated. A division expression of TI_TOTAL÷N is calculated by using the total injection pulse width TI_TOTAL calculated in Step 801 and the division count N calculated in Step 804.

In Step 808, an EGR rate is calculated. The EGR rate REGR is obtained by calculating a division expression of QEGR÷(QA+QEGR) by using an EGR gas amount QEGR sensed by the EGR flow rate sensor 114 and an intake air amount QA sensed by the airflow sensor 103.

In Step 809, an injection timing (an injection start timing) of each injection in the divided multi-stage injection is set. The detail of Step 809 is shown in FIG. 9.

In Step 810, an increment process of the counter n is performed, and the processing returns to Step 805. In this way, processing of n=1 to N is repeated, and each injection pulse width and each injection timing are set.

Figure 9:
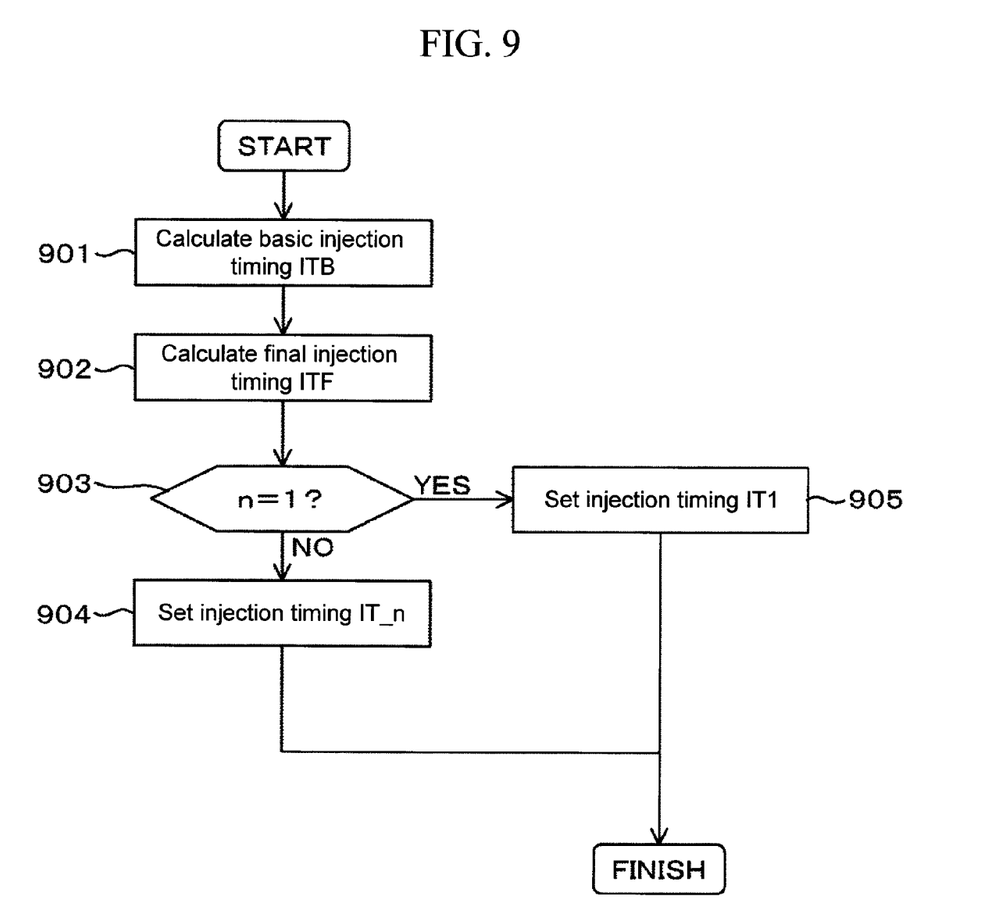
FIG. 9 is a flow chart showing processing contents of divided injection timing setting shown in FIG. 8.

With reference to FIG. 9, the detail of Step 809 (injection timing setting) of FIG. 8 is described.

In Step 901, a basic injection timing is calculated.

Figure 10:
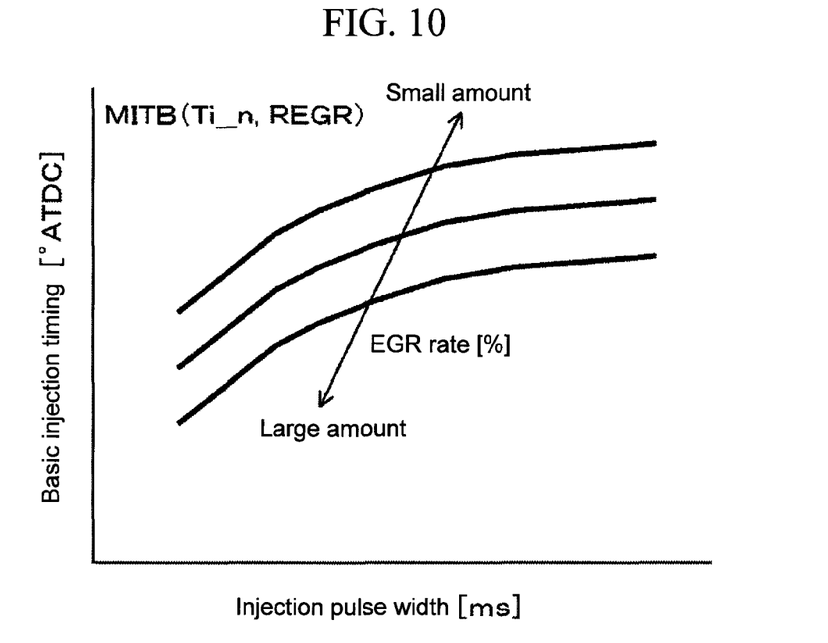
FIG. 10 is a graph showing a map function for calculating a basic injection timing shown in FIG. 9.

The basic injection timing ITB is calculated by using, as inputs, the divided injection pulse width TI_n calculated in Step 807 of FIG. 8 and the EGR rate REGR calculated in Step 808 of FIG. 8 to thereby refer to a map MITB as shown in FIG. 10. The map MITB sets thereon a basic fuel injection timing (a basic fuel injection start timing) in consideration of a fuel attachment amount based on the divided fuel injection amount and a vaporization rate increase amount based on EGR.

In Step 902, a final injection timing (a final fuel injection start timing) ITF, to which correction of a piston crown surface temperature TPI is added, is calculated.

Figure 11:
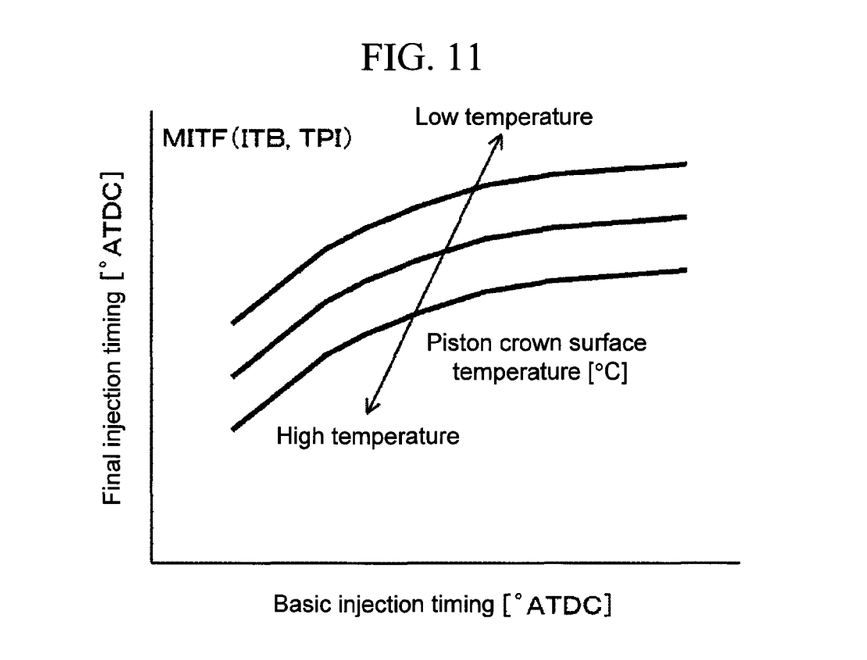
FIG. 11 is a graph showing a map function for calculating a final injection timing shown in FIG. 9.

The final injection timing ITF is calculated by using, as inputs, the basic injection timing ITB calculated in Step 901 and the piston crown surface temperature TPI to thereby refer to a map MITF as shown in FIG. 11. The map MITF is set in consideration of an influence of the piston crown surface temperature TPI on a fuel attachment amount and a vaporization rate. In addition, it is desirable to estimate the crown surface temperature TPI according to a method of using an air amount, an air-fuel ratio, ignition timing, and the like to thereby configure a thermal model. From a point of view of simplification in control, the crown surface temperature TPI may be estimated by using, as input values, a water temperature and an oil temperature sensed by the water temperature sensor 202 and the oil temperature sensor 205 to thereby search the map MITF.

In Step 903, it is determined whether or not the first injection timing (the first injection start timing) of the divided injections in one cycle is to be set. If n=1, the processing proceeds to Step 905, and is finished by making such setting that the first injection timing IT1=ITF. If n≠1 (in the case of the second or subsequent injection timing), the processing proceeds to Step 904, and an n-th injection start possible angle IT_n is calculated. The n-th injection start possible angle IT_n is calculated by adding the divided injection pulse width TI_(n−1) and the injection interval TI_INT calculated in Step 803 of FIG. 8 to previous IT_(n−1).

Figure 12:
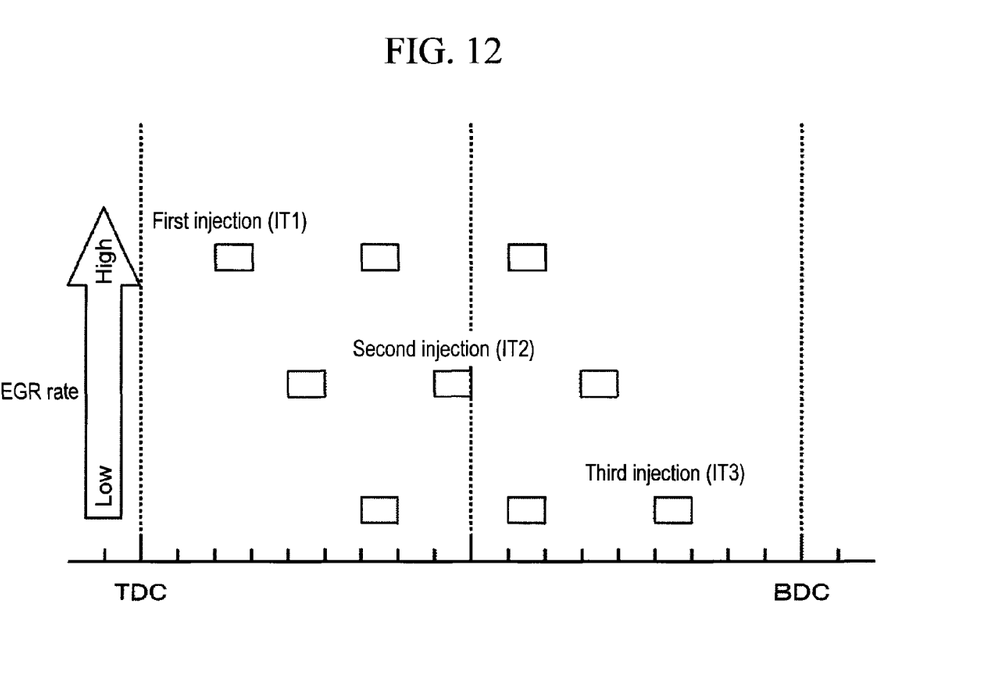
FIG. 12 is a diagram illustrating a first control example of the divided multi-stage injection control according to the embodiment of the present invention.
Figure 13:
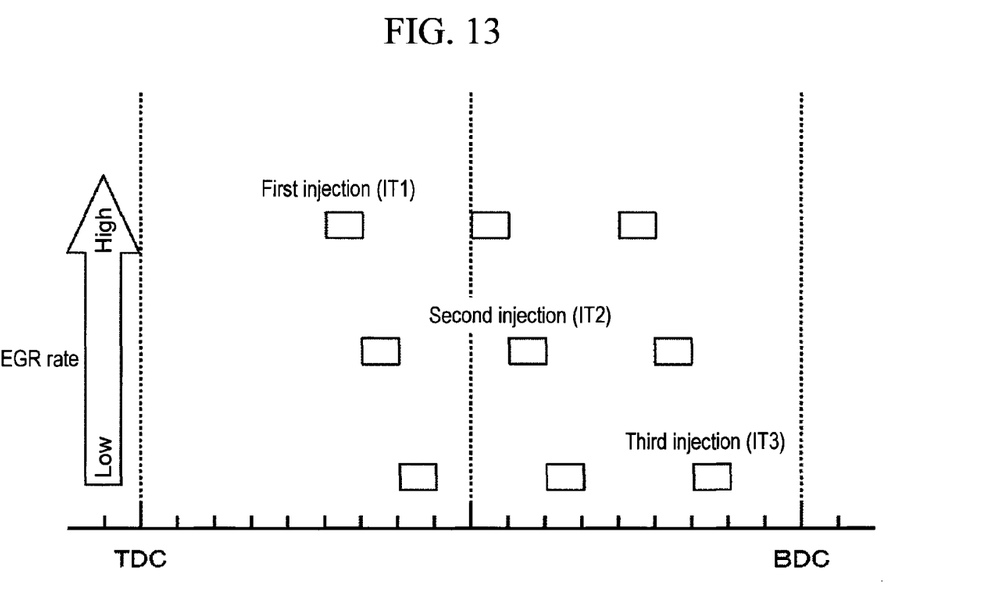
FIG. 13 is a diagram illustrating a second control example of the divided multi-stage injection control according to the embodiment of the present invention.

With reference to FIG. 12 and FIG. 13, specific control examples obtained by configuring as shown in FIG. 8 to FIG. 11 are described.

FIG. 12 is a diagram illustrating an injection timing when fuel injection is dividedly performed three times in 1 cycle in the state where the piston crown surface temperature is high, for example, in the case where the engine is completely warmed up. The lower part corresponds to when the EGR amount has a small flow rate, the middle part corresponds to when the EGR amount has a middle flow rate, and the upper part corresponds to when the EGR amount has a large flow rate. The first injection timing is advanced in accordance with the EGR amount. The second and subsequent injections are also changed to the advance side in accordance with the first injection timing advance amount, while the injection interval is maintained.

FIG. 13 is a diagram illustrating an injection timing when fuel injection is dividedly performed three times in 1 cycle in the state where the piston crown surface temperature is lower than the piston crown surface temperature (ordinary temperature) in the complete warming up of the engine, for example, in the middle of a warm-up operation after start of the engine. The lower part corresponds to when the EGR amount has a small flow rate, the middle part corresponds to when the EGR amount has a middle flow rate, and the upper part corresponds to when the EGR amount has a large flow rate. Although the first injection timing is advanced in accordance with the EGR amount similarly to the case illustrated in FIG. 12 where the piston crown surface temperature is high, the first injection timing is closer to the retard side than the case where the temperature is high. In the same manner, the second and subsequent injections are changed to the advance side in accordance with the first injection timing advance amount, while the injection interval is maintained.

What is claimed is:

1. A control device for an in-cylinder injection type internal combustion engine, in which a fuel injection valve which injects fuel directly into a combustion chamber and an EGR device which allows exhaust gas emitted from the combustion chamber to flow back into the combustion chamber are provided, the control device comprising divided multi-stage injection means for performing fuel injection a plurality of times in one cycle, wherein:
   at least a first fuel injection of the respective injections dividedly performed the plurality of times is performed in an intake stroke;
   the fuel injected into the combustion chamber and an intake air are used to generate a mixture gas, the mixture gas being ignited by ignition energy from an ignition coil;
   at least a start timing of a first injection of the respective injections dividedly performed the plurality of times is set in accordance with an EGR amount; and
   the first injection start timing is more advanced when the EGR amount is large than when the EGR amount is small.

2. The control device according to claim 1, wherein:
   a parameter which affects a crown surface temperature of a piston provided in the in-cylinder injection type internal combustion engine is detected; and
   at least the first injection start timing of the respective injections dividedly performed the plurality of times is set on a basis of the parameter.

3. The control device according to claim 2, wherein the parameter is one of a cooling water temperature of the in-cylinder injection type internal combustion engine and a lubricating oil temperature of the in-cylinder injection type internal combustion engine.

4. The control device according to claim 2, wherein at least the first injection start timing of the respective injections dividedly performed the plurality of times is more retarded when the parameter is low temperature than when the parameter is ordinary temperature.

5. A control system for a gasoline in-cylinder injection type internal combustion engine, the control system comprising:
   a fuel injection valve configured to inject fuel directly into a combustion chamber;
   an ignition unit configured to ignite an intake air and the fuel using electricity supplied from an ignition coil;
   an EGR device that allows exhaust gas emitted from the combustion chamber to flow back into the combustion chamber are provided; and
   divided multi-stage injection means for performing fuel injection a plurality of times in one cycle, wherein:
      at least a first fuel injection of the respective injections dividedly performed the plurality of times is performed in an intake stroke,
      at least a start timing of a first injection of the respective injections dividedly performed the plurality of times is set in accordance with an EGR amount; and
      the first injection start timing is more advanced, regardless of the temperature in the combustion-chamber, when the EGR amount is large than when the EGR amount is small.

6. The control system according to claim 5, wherein:
   a parameter which affects a crown surface temperature of a piston provided in the in-cylinder injection type internal combustion engine is detected; and
   at least the first injection start timing of the respective injections dividedly performed the plurality of times is set on a basis of the parameter.

7. The control system according to claim 6, wherein the parameter is one of a cooling water temperature of the in-cylinder injection type internal combustion engine and a lubricating oil temperature of the in-cylinder injection type internal combustion engine.

8. The control system according to claim 6, wherein at least the first injection start timing of the respective injections dividedly performed the plurality of times is more retarded when the parameter is low temperature than when the parameter is ordinary temperature.

* * * * *